United States Patent [19]

Boutni et al.

[11] Patent Number: 4,778,855
[45] Date of Patent: Oct. 18, 1988

[54] THERMOPLASTIC MOLDING COMPOSITIONS EXHIBITING IMPROVED MELT FLOW PROPERTIES

[75] Inventors: Omar M. Boutni; John A. Tyrell, both of Mt. Vernon, Ind.

[73] Assignee: General Electric Company, Mt. Vernon, Ind.

[21] Appl. No.: 945,740

[22] Filed: Dec. 23, 1986

[51] Int. Cl.$^4$ .............................................. C08L 69/00
[52] U.S. Cl. .................................... 525/146; 525/439; 525/444
[58] Field of Search ................. 525/439, 146, 466, 444

[56] References Cited

U.S. PATENT DOCUMENTS 4,510,289  4/1985  Fox et al. .......................... 525/148

FOREIGN PATENT DOCUMENTS 0150454  7/1985  European Pat. Off. .
0097049  8/1978  Japan .

Primary Examiner—Theodore E. Pertilla
Attorney, Agent, or Firm—Martin B. Barancik

[57] ABSTRACT

An aromatic carbonate resin composition comprising:
  (i) at least one aromatic carbonate resin; and
  (ii) a copolyetherester comprised of a multiplicity of long chain ester units and short chain ester units joined head-to-tail through ester linkages, said long chain ester units being comprised of the reaction products of a dicarboxylic acid or its derivative and a poly(alkylene oxide)glycol, and said short chain ester units being comprised of the reaction products of a dicarboxylic acid or its derivative and at least one low molecular weight diol.

The compositions contain an amount of said copolyetherester effective to improve the melt flow or processability of the aromatic carbonate resin. The instant compositions may optionally contain an impact modifying amount of at least one impact modifying compound. The instant compositions are useful in the preparation of extruded or molded shaped articles.

21 Claims, No Drawings

THERMOPLASTIC MOLDING COMPOSITIONS EXHIBITING IMPROVED MELT FLOW PROPERTIES

BACKGROUND OF THE INVENTION

Aromatic carbonate resins are well known thermoplastic resins which, due to their many excellent physical and chemical properties, are used as thermoplastic engineering materials. They exhibit, for example, excellent properties of toughness, flexibility, impact resistance, and optical clarity. However, while possessing many advantageous mechanical and chemical properties these aromatic carbonate resins, due to their relatively high melt viscosities, are generally somewhat difficult to process. This is particularly true for aromatic copolyester-carbonate resins.

It has now been discovered that aromatic carbonate resin compositions can be provided which exhibit improved melt flow, i.e., improved processability.

SUMMARY OF THE INVENTION

The instant invention is directed to aromatic carbonate resin compositions exhibiting improved or higher melt flow rates. The instant compositions comprise (i) at least one aromatic carbonate resin, (ii) an amount effective to improve the processability of said aromatic carbonate resin of at least one copolyetherester, and optionally (iii) an impact modifying amount of at least one impact modifier.

DESCRIPTION OF THE INVENTION

In accordance with the instant invention there are provided aromatic carbonate resin compositions suitable for molding exhibiting improved melt flow or processability. The compositions of the instant invention are comprised of:

(i) at least one aromatic carbonate resin;
(ii) an amount effective to improve the melt flow of said aromatic carbonate resin of at least one segmented thermoplastic copolyetherester polymer; and
optionally (iii) an impact property improving amount of at least one impact modifier.

The term "aromatic carbonate resins or polymers" as used herein is meant to include both the aromatic polycarbonates and the copolyester-carbonates. The aromatic polycarbonates for use herein can generally be prepared by the reaction of at least one dihydric phenol and a carbonate precursor such as phosgene, a haloformate, or a carbonate ester. Generally, such aromatic polycarbonates may be typified as being comprised of at least one recurring structural unit represented by the formula

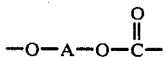

wherein A is the divalent aromatic residue, absent the hydroxy groups, of the dihydric phenol employed in the polymer forming reaction. Preferably, the polycarbonate resins of the present invention have an intrinsic viscosity, as measured in methylene chloride, at 25° C., ranging from about 0.30 to about 1.00 dl/gm. The dihydric phenols which may be employed to provide the aromatic carbonate polymers may be represented by the formula

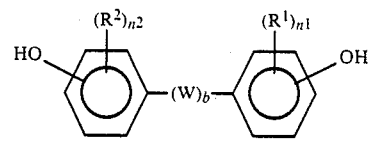

wherein:

$R^2$ is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals,

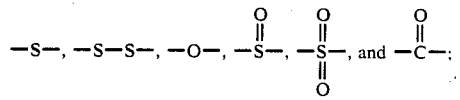

$n^2$ and $n^1$ are independently selected from integers having a value of from 0 to 4 inclusive; and b is either zero or one.

The monovalent hydrocarbon radicals represented by $R^2$ and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by $R^2$ and $R^1$ are chlorine and bromine.

The divalent hydrocarbon radicals represented by W include the alkylene, alkylidene, cycloalkylene and cycloalkylidene radicals. The preferred alkylene radicals are those which contain from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by $R^2$ and $R^1$ may be represented by the formula $-OR^3$ wherein $R^3$ is a monovalent hydrocarbon radical of the type described hereinafore for $R^2$ and $R^1$. Preferred monovalent hydrocarbonoxy radicals are the alkoxy and aryloxy radicals.

Some illustrative non-limiting examples of the dihydric phenols falling within the scope of Formula II include:

2,2-bis(4-hydroxyphenyl) propane (bisphenol-A);
2,2-bis(3,5-dibromo-4-hydroxyphenyl) propane;
2,2-bis(3,5-dimethyl-4-hydroxyphenyl) propane;
1,1-bis(4-hydroxyphenyl) cyclohexane;
1,1-bis(3,5-dimethyl-4-hydroxyphenyl) cyclohexane;
1,1-bis(4-hydroxyphenyl)decane;
1,4-bis(4-hydroxyphenyl)propane;
1,1-bis (hydroxyphenyl) cyclododecane;
1,1-bis(3,5-dimethyl-4-hydroxyphenyl) cyclododecane;
4,4'-dihydroxydiphenyl ether;
4,4'-thiodiphenol;
4,4'-dihydroxy-3,3'-dichlorodiphenyl ether; and 4,4'-dihydroxy-2,5-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

These aromatic polycarbonates can be manufactured by known processes, such as, for example and as mentioned above, by reacting a dihydric phenol with a carbonate precursor, such as phosgene, in accordance with methods as set forth in the above-cited literature and U.S. Pat. Nos. 4,018,750 and 4,123,436, incorporated herein by reference, or by transesterification processes such as disclosed in U.S. Pat. No.3,153,008, incorporated by reference, as well as other processes known to those skilled in the art.

It is possible to employ two or more different dihydric phenols or a copolymer of a dihydric phenol with a glycol or with a hydroxy or acid terminated polyester or with a dibasic acid in the event a carbonate copolymer or interpolymer rather than a homopolymer is desired for use in the preparation of the polycarbonate mixture of the invention. Branched polycarbonates are also useful, such as those described in U.S. Pat. No. 4,001,184, incorporated herein by reference. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use herein is a homopolymer derived from 2,2-bis(4-hydroxyphenyl) propane (bisphenol-A).

The copolyestercarbonate resin are well known in the art and are described, along with methods for their preparation, inter alia, in U.S. Pat. No. 3,169,121, incorporated herein by reference, as well as in U.S. Pat. Nos. 4,238,596; 4,156,069 and 4,238,597, all of which are likewise incorporated herein by reference.

Briefly stated the high molecular weight thermoplastic aromatic copolyestercarbonates comprise recurring carbonate groups, carboxylate groups, and aromatic carbocyclic groups in the polymer chain in which at least some of the carbonate groups and at least some of the carboxylate groups are bonded directly to the ring carbon atoms of the aromatic carbocylic groups.

These copolyester-carbonates contain ester bonds and carbonate bonds in the chain, wherein the amount of ester bonds is in the range of from about 25 to about 90 mole percent, preferably from about 35 to about 80 mole percent. For example, 5 moles of bisphenol-A reacting completely with 4 moles of isophthaloyl dichloride and 1 mole of phosgene would give a copolyestercarbonate of 80 mole percent ester bonds.

The copolyestercarbonates may be prepared by a variety of methods including interfacial polymerization, melt polymerization, and transesterification.

These copolyestercarbonates may be readily prepared by the reaction of a dihydric phenol, a carbonate precursor, and an ester precursor. The dihydric phenols and the carbonate precursors are the same as those described hereinafore for the preparation of the polycarbonates. The ester precursor may be a difunctional carboxylic acid or, preferably, its ester forming reactive derivative. The difunctional carboxylic acids are described in U.S. Pat. No. 3,169,121, incorporated herein by reference.

The preferred ester forming reactive derivatives of the difunctional carboxylic acids are the diacid halides, preferably the diacid chlorides. Some illustrative non-limiting examples of these derivatives include isophthaloyl dichloride, terephthaloyl dichloride, and mixtures thereof. A particularly useful mixture of the ester forming reactive derivatives of isophthalic and terephthalic acid is one which contains, in a weight ratio, from about 1:10 to about 9.8:0.2 of isophthaloyl dichloride to terephthaloyl dichloride.

Also included within the scope of the instant invention are the thermoplastic randomly branched copolyestercarbonates. These are derived from a dihydric phenol, a carbonate precursor, an ester precursor, and a minor amount of a branching agent. The branching agents are well known in the art and are generally aromatic compounds containing at least three functional groups which may be hydroxyl, carboxyl, carboxylic anhydride, haloformyl, or mixtures thereof. Some illustrative non-limiting examples of these branching agents include trimellitic anhydride, trimellitic acid, trimellityl trichloride, 4-chloroformyl phthalic anhydride, pyromellitic dianhydride, pyromellitic acid, mellitic acid, mellitic anhydride, trimesic acid, and benzophenonetetracarboxylic acid.

Also included herein are blends of linear and branched copolyestercarbonates.

A particularly useful class of aromatic copolyestercarbonates is that derived from bisphenol-A; phosgene; and isophthalic acid, terephthalic acid, or mixtures of isophthalic acid and terephthalic acid or the reactive ester forming derivatives of these acids uuch as terephthaloyl dichloride, isophthaloyl dichloride, or a mixture of isophthaloyl dichloride and terephthaloyl dichloride. The molar range of terephthalate units, the remainder of the copolymer ester units preferably comprising isophthalate units, is generally from 2 to about 98 percent, and preferably from about 5 to about 75 percent.

The copolyetherester polymers used in the present invention are well known in the art and are generally commercially available or may be readily prepared by known and conventional processes. The copolyetherester polymer which is blended with the aromatic carbonate resin consists essentially of a multiplicity of recurring intralinear long-chain and short-chain ester units connected heat-to-tail through ester linkages, said long-chain ester units being represented by the formula

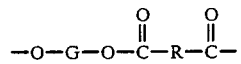   III.

and said short-chain ester units being represented by the formula

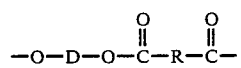   IV.

wherein
G is a divalent radical remaining after removal of terminal hydroxyl groups from poly(alkylene oxide) glycols having a carbon-to-oxygen ratio of about 2.0–4.3 and a molecular weight between about 400 to 6000,
R is a divalent radical remaining after removal of carboxyl groups from a dicarboxylic acid having a molecular weight less than about 300, and D is a divalent radical remaining after removal of hydroxyl groups from a low molecular weight diol having a molecular weight less than about 250.

Preferably the short-chain ester units constitute about 15-95% by weight, more preferably about 25-90 wt. %, and most preferably 35-55% by weight of the copolyetherester.

The term "long-chain ester units" as applied to units in the copolyetherester polymer chain refers to the reaction product of a long-chain glycol with a dicarboxylic acid. Such long-chain ester units, which are a repeating unit in the copolyetheresters used in this invention, correspond to Formula III. The long-chain glycols are polymeric glycols having terminal (or as nearly terminal as possible) hydroxy groups and a molecular weight of from about 400 to about 6000. The long-chain glycols used to prepare the copolyetheresters of this invention are poly(alkylene oxide)glycols having a carbon-to-oxygen ratio of about 2.0-4.3.

Representative long-chain glycols include poly (ethylene oxide)glycol, poly(1,2- and 1,3-propylene oxide)glycol, poly(tetramethylene oxide)glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio does not exceed about 4.3). The preferred long-chain glycol is poly(tetramethylene oxide)glycol.

The term "short-chain ester units" as applied to units in the polymer chain refers to low molecular weight compounds or polymer chain units having molecular weights less than about 550. They are made by reacting a low molecular weight diol (below about 250) with a dicarboxylic acid to form ester units represented by Formula IV.

Included among the low molecular weight diols which react to form the short-chain ester units are aliphatic, cycloaliphatic, and aromatic dihydroxy compounds. The aliphatic dihydroxy compounds include the saturated and unsaturated, preferably monounsaturated, compounds. Preferred are diols containing from 2 to about 15 carbon atoms. Some illustrative non-limiting examples of these diols are ethanediol, propanediol, butanediol, butenediol, propanediol, isopropanediol, hexanediol, pentanediol, decanediol, cyclohexanediol, cyclohexanedimethanol, and the like. Exemplary of the aromatic diols are resorcinol, hydroquinone, 1,5-dihydroxy naphthalene, and the like. Especially preferred diols are the aliphatic diols containing from 2 to about 8 carbon atoms. Of these butanediol, hexanediol, and mixtures thereof are more preferred.

Equivalent ester forming derivatives of diols are also useful (e.g., ethylene oxide or ethylene carbonate can be used in place of ethylene glycol). The term "low molecular weight diols" as used herein should be construed as including such equivalent ester forming derivatives, provided, however, that the molecular weight requirement pertains to the diol and not to its derivatives.

Dicarboxylic acids which are reacted with the forgoing diols are aliphatic, cycloaliphatic, and aromatic dicarboxylic acids of a low molecular weight, i.e., having a molecular weight of less than about 300. The term "dicarboxylic acids" as used herein includes the equivalents of dicarboxylic acids having two functional carboxyl groups which perform substantially like dicarboxylic acids in reaction with glycols and diols in forming copolyester polymers. These equivalents include esters and ester-forming derivatives such as acid halides and anhydrides. The molecular weight requirement pertains to the acid and not to its equivalent ester or ester forming derivative. Thus, an ester of a dicarboxylic acid having a molecular weight greater than 300 is included provided the acid has a molecular weight below 300. The dicarboxylic acids can conatin any substituent group(s) or combinations thereof which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present they can be joined by aliphatic or aromatic divalent radicals or divalent radicals such as —O— or —SO$_2$—.

Representative aliphatic and cycloaliphatic acids which can be used for this invention include sebacic acid, 1,3-cyclohexane dicarboxylic acid, 1,4-cyclohexane dicarboxylic acid, adipic acid, glutaric acid, succinic acid, carbonic acid, oxalic acid, azeleic acid, diethyl malonic acid, 4-cyclohexane-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis(cyclohexane carboxylic acid), 3,4-furan dicarboxylic acid, and 1,1' cyclobutane dicarboxylic acid. Preferred aliphatic acids are cyclohexane dicarboxylic acids and adipic acid.

Representative aromatic dicarboxylic acids which can be used include terephthalic acid, isophthalic acid, bibenzoic acid, substituted dicarboxy compounds with two benzene nuclei such as bis(p-carboxyphenyl) methane, p-oxy(p-carboxyphenyl)banzoic acid, ethylenebis(p-oxybenzoic acid), 1,5-naphthalene dicarboxylic acid, 2,6-naphthalene dicarboxylic acid, phenanthrene dicarboxylic acid, anthracene dicarboxylic acid, 4,4-sulfonyl dibenzoic acid, and $C_1$–$C_{12}$ alkyl and ring substitution derivatives thereof, such as halo, alkoxy, and aryl derivatives. Hydroxy acids such as p(beta-hydroxyethoxy)benzoic acid can also be used provided as aromatic dicarboxylic acid is also present.

Aromatic dicarboxylic acids are especially preferred for preparing the copolyetherester polymers of this invention. Among the aromatic acids those with 8-16 carbon atoms are preferred, particularly the phneylene dicarboxylic acids, i.e., phthalic, terephthalic and isophthalic acids and their dimethyl derivatives. Particularly preferred is dimethyl terephthalate.

A preferred emodiment of the present invention are copolyetheresters derived from dimethyl terephthalate as the dicarboxylic acid, poly(tetramethylene oxide)glycol as the long-chain glycol, and a mixture of butanediol, preferably 1,4-butanediol and hexanediol as the low molecular weight diols. The mixture of butanediol and hexanediol preferably contains at least about 40 weight percent of butanediol, preferably from about 50 to about 90 weight percent, more preferably from about 55 to about 90 weight percent, and most preferably from about 60 to about 80 weight percent.

Since, in the preparation of the preferred copolyetheresters of the present invention a mixture of butanediol and hexanediol is used, the short chain ester unit of Formula IV will be comprised of two sub-units. These sub-units may be represented by the Formulae

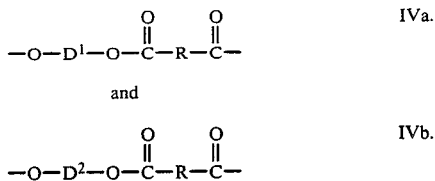

wherein
$D^1$ is the residue, absent the two hydroxy groups, of butanediol,
$D^2$ is the residue, absent the two hydroxy groups, of hexanediol, and
R is the residue of dimethylterephthalate.

The copolyetheresters may be made by conventional ester interchange reactions. A preferred procedure involves heating the dicarboxylic acid, e.g., dimethyl ester of terephthalic acid with a long chain glycol, e.g., poly(tetramethylene oxide)glycol having a molecular weight of about 600 to 2000 and a molar excess of low molecular weight diol, e.g., a mixture of 1,4-butanediol and hexanediol, in the presence of a catalyst at about 150°–160° C. and a pressure of 0.5 to 5 atmospheres, preferably ambient pressure, while distilling off methanol formed by the ester interchange. Depending upon temperature, catalyst, glycol excess, and equipment, this reaction can be completed within a few minutes, e.g., 2 minutes, to a few hours, e.g., 2 hours.

Concerning the molar ratio of reactants, at least about 1.1 mole of diol should be present for each mole of acid, preferably at least about 1.25 mole of diol for each mole of acid. The long chain glycol should be present in an amount of about 0.0025 to 0.85 mole pre mole of dicarboxylic acid, preferably 0.01 to about 0.6 mole per mole of acid.

This procedure results in the preparation of a low molecular weight prepolymer which can be carried to the high molecular weight copolyetherester of this invention by the procedure described below. Such prepolymers can also be prepared by a number of alternate esterification processes, for example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternately, the short chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long chain glycol.

The resulting prepolymer is then carried to high molecular weight by distillation of the excess of short chain diol. This process is known as polycondensation. condensation.

Additional ester interchange occurs during this polycondensation which serves to increase the molecular weight and to randomize the arrangement of the copolyetherester units. Best results are usually obtained when this final distillation or polycondensation is run at less than about 5 mm pressure and about 200°–270° C. for less than about two hours.

Most practical polymerization techniques rely upon ester interchange to complete the polymerization reaction. A catalyst for this ester interchange is generally employed. While a wide variety of catalysts can be employed, organic titanates such as tetrabutyl titanate used alone or in combination with magnesium or calcium acetates are preferred. The catalyst should be present in the amount of from about 0.005 to 2.0% by weight based on total reactants.

Ester interchange polymerizations are generally run in the melt without added solvent, but inert solvents can be used to facilitate removal of volatile components from the mass at low temperatures.

The dicarboxylic acids or their derivatives and the polymeric glycol are incorporated into the final product in the same molar proportions as are present in the ester interchange reaction mixture. The amount of low molecular weight diol actually incorporated corresponds to the difference between the moles of dicarboxylic acid and polymeric glycol present in the reaction mixture. When mixtures of low molecular weight diols are employed, the amounts of each diol incorporated are largely a function of the amounts of diols present, their boiling points, and relative reactivities. The total amount of diol incorporated is still the difference between moles of dicarboxylic acid and polymeric glycol.

The amount of the copolyetherester that is admixed with the aromatic carbonate resin is an amount which is effective to imrpove the melt flow rate and, therefore, the processability of the aromatic carbonate resin. This amount is generally from about 0.5 to about 30 weight percent, preferably from about 1 to about 20 weight percent, and more preferably from about 1 to about 15 weight percent. Weight percent of copolyetherester is based on the total amounts, in weight, of copolyetherester and aromatic carbonate resin present.

Generally, if less than about 0.5 weight percent of the copolyetherester is present there will be no significant improvement in the melt flow of the aromatic carbonate resin, i.e., improvement in the processability of said resin. If, on the other hand, the compositions contain in excess of about 30 weight percent of the copolyetherester the properties imparted to the composition by the aromatic carbonate resin will be significantly diminished or diluted.

The addition of the copolyetherester to the aromatic carbonate resin will tend to generally lower the impact properties of the aromatic carbonate resin. In order to improve the impact properties of the copolyetherester-/aromatic carbonate resin compositions an impact modifier can be added to this composition. The impact modifiers that can be added to the instant compositons are well known in the art and are those that serve to positively upgrade the impact properties of aromatic carbonate resins. Examples of these impact modiifers include, but are not limited to, the following general categories:
polyacrylates;
polyolefins;
styrenic resins:
rubbery dienic polymers; and
organopolysiloxane-polycarbonate block copolymers.

The polyacrylates which may be employed as impact modifiers are rubbery homopolymers or copolymers. In general the polyacrylates described in Brinkman et al. in U.S. Pat. No. 3,581,659, which is incorporated herein by reference, can be used, especially those containing units derived from alkyl acrylates, particularly n-butyl acrylate. Acrylate containing copolymers wherein the other monomer is, for example, derived from a ethacrylate are also employable, see for example Japanese Patent Application Announcement No. 1968-81611, incorporated herein by reference. Preferably the acrylate resin will be in the form of a rubber-elastic graft copolymer having a glass transition temperature below about $-20°$ C., Sclichting, U.S. Pat. No. 4,022,748, incorporated herein by reference. More particularly, the acrylate resin will comprise a multiple stage polymer having a rubbery first stage (core) and a thermoplastic hard final stage (shell), see Farnham, U.S. Pat. No. 4,096,202, incorporated herein by reference.

The most preferred acrylate resin is a multiphase composite interpolymer comprised of a $C_1$–$C_5$ acrylate and a $C_1$–$C_5$ methacrylate. These interpolymers consist of about 25 to 95 weight percent of a first elastomeric phase polymerized from a monomer system comprising about 77 to 99.8 weight percent of a $C_1$–$C_5$ alkyl acrylate, 0.1 to 5 weight percent of crosslinking monomer, 0.1 to 5 weight percent of graftlinking monomer, and about 75 to 5 weight percent of a final rigid thermoplastic phase polymerized in the presence of said elastomeric phase.

The crosslinking monomer is polyethylenically unsaturated monomer having a plurality of addition polymerizable reactive groups which all polymerize at substantially the same rate of reaction. Suitable crosslinking monomers include the polyacrylic and polymethacrylic esters of polyols such as butylene diacrylate and dimethacrylate, trimethylol propane trimethacrylate, and the like; di- and trivinyl benzene, vinyl acrylate and methacrylate, and the like. Preferred crosslinking monomer is butylene diacrylate.

The graftlinking monomer is polyethylenically unsaturated monomer having a plurality of addition polymerizable reactive groups, at least one of which polymerizes at substantially different rates of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to the surface of the elastomer. Among the effective graftlinking monomers are the alkyl group containing monomers of alkyl esters of ethylenically unsaturated acids such as allyl acrylate, allyl methacrylate, diallyl maleate, diallyl fumarate, and allyl acid itaconate. Somewhat less preferred are the diallyl esters of polycarboxylic acids which do not contain polymerizable unsaturation. The preferred graftlinking monomers are allyl methacrylate and diallyl maleate.

A most preferred interpolymer has only two stages, the first stage comprising about 60 to about 95 weight percent of the interpolymer and being polymerized from a monomer system comprising 95 to 99.8 percent by weight butyl acrylate, 0.2 to 1.5 weight percent butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate. The multiphase composite interpolymer ACRYLOID KM-330 available from Rohm and Haas is preferred. This interpolymer is comprised of small quantities of crosslinking and graftlinking monomers, about 80 weight percent n-butyl acrylate, and about 20 weight percent methyl methacrylate.

Another quite useful acrylate based resin impact modifier is an acrylate-styrene-acrylonitrile resin, the so called ASA resin. Such resins are described in Yu et al., U.S. Pat. No. 3,944,631, incorporated herein by reference. Basically, this resin is comprised of from about 10 to about 50 weight percent of a crosslinked acrylate polymer having a Tg of less than $25°$ C., from about 5 to about 35 weight percent of a crosslinked styrene-acrylonitrile copolymer, and from about 15 to about 85 weight percent of a non-crosslinked or linear styrene-acrylonitrile copolymer. The composition is made by a three-step sequence comprising emulsion polymerizing of an alkyl (meth)acrylate containing at least one crosslinking monomer, emulsion polymerizing a monomer mixture of styrene, acrylonotrile and at least one crosslinking monomer in the presence of the crosslinked acrylate elastomer formed in the previous step, and finally emulsion polymerizing or suspension polymerizing of styrene and acrylonitrile in the presence of the previously formed product.

The acrylic elastomeric particles used in preparing these resins comprise crosslinked acrylic polymers or copolymers having a Tg of less than about $25°$ C. which can be polymerized by means of free radical initiated emulsion techniques. These acrylic elastomer particles are crosslinked so that they can retain their size and shape during subsequent polymer processing steps. This crosslinking is achieved during the polymerization of the elastomer by including a polyfunctional ethylenically unsaturated monomer in the polymerization reaction mixture.

Examples of acrylic elastomers that can be used include the crosslinked polymers of $C_2$–$C_{10}$ alkyl acrylate and $C_8$–$C_{22}$ alkyl methacrylate monomers, preferably the $C_4$–$C_8$ alkyl acrylates such as n-butyl acrylate, ethyl acrylate, and 2-ethylhexacrylate. The most preferred acrylate is n-butyl acrylate. At least one acrylate monomer is used in this step. It is also possible to utilize mixtures of two or more different acrylate or methacrylate monomers, as well as mixtures of acrylate and methacrylate monomers. If desired, the monomer charge may optionally contain small amounts, i.e., 1–20% by weight of the amount of acrylate monomer, of such monomers as styrene, acrylonitrile, methacrylic acid, acrylic acid, vinylidene chloride, vinyl toluene and any other ethylenically unsaturated monomer copolymerizable with the (meth)acrylate monomer selected from use.

The polyolefins which can be employed as impact modifiers are the homopolymers and the copolymers. Preferred polyolefins are those which are derived from monomers containing from 2 to about 10 carbon atoms. Some illustrative non-limiting examples of these polyolefins include polyethylene, polypropylene, polybutylene, polyhexene, polyisobutylene, and ethylenepropylene copolymer.

Methods for the preparation of the polyolefins are abundantly described in the literature and are well known to those skilled in the art. Polyethylene, for example, can be prepared by various procedures using cationic, anionic or free radical initiating catalysts, with conditions varied to produce a range of molecular weights and densities and various degrees of branching or non-branching. In one procedure, which involves free radical initiation, ethylene gas is polymerized in the presence of a peroxide initiating catalyst at a pressure between 15,000 and 40,000 psi and a temperature between 100° C. and 200° C. to produce a relatively low density polymer, i.e., 0.90 to 0.94 gm/cm$^3$.

The polyetheylene can also be prepared by low pressure processes effective to attain a polymer of higher molecular weight and a higher density. In one such procedure, known as the Phillips process, ethylene is contacted in an inert solvent slurry of a catalyst such as chromium oxide supported on silica-aluminum, at pressures of 400 to 500 psi and temperatures of 130° to 170° C., followed by extraction of the polymer with hot solvent and purification, to produce a polyethylene product having a density between 0.96 to 0.97 gm/cm$^3$.

Still other procedures are possible, such as emulsion polymerization in aqueous media in the presence of a peroxy compound, as well as suspension polymerization at low temperatures using a silver salt-peroxide redoxy system.

Also employable as an impact modifier is polypropylene a common commercial form of which is isotatic polypropylene. Such polymers can be prepared by anionically initiated reactions using Ziegler type catalysts, e.g., titanium halide such as $TiCl_3$ in combination with an organometallic co-catalyst such as trialkyl aluminum halide. Polymerization proceeds readily at temperatures between 25° C. and 100° C. to yield a polymer in the form of a slurry of insoluble granular powder.

Copolymers of ethylene and propylene can be prepared using procedures similar to those for polyethylene and other polyolefins; for instance by the polymerization reaction of a mixture of ethylene and propylene in the presence of a Ziegler type catalyst or by free-radical initiation under high pressures.

Polymers based on still higher olefins are not as readily available and, therefore, not as preferred. Examples of such higher polyolefins are polymers based on 2-methyl-1-butene, 1-pentene, 4-methyl-1-pentene, and the like. They can be prepared by known procedures including those described in Encyclopedia of Polymer Science and Technology, John Wiley & Sons, Inc., Vol. 9, pp- 440–460, 1965, incorporated herein by reference.

The linear low density polyolefins, such as linear low density polyethylene, may be prepared by state of the art polymerization processes such as those described in U.S. Pat. No. 4,076,698, incorporated herein by reference. The polymers may have a density between 0.89 and 0.96 gm/cc and a controlled concentration of simple side branching as opposed to random branching which distinguishes them from polymers such as high pressure low density polyethylene and high density polyethylene. The preferred range of density is from 0.915 to about 0.945 gm/cc. The linear low desnity polyethylenes are made from ethylene and alpha-olefins of 3 to 8 carbon atoms, e.g., butene-1, octene-1, etc., or mixtures thereof. The comonomer is generally used in minor amounts, e.g., 10 mole % or less of the total amount of monomers. A preferred range is about 1-3 mole %. A particularly useful copolymer is made from ethylene and butene such as, for example, ESCORENE LPX-15 marketed by Exxon Chemical Co.

Some particularly useful linear low density polyethylenes are those made from ethylene and a $C_4$–$C_7$ alpha olefin as comonomer. Such linear low density polyethylenes, as well as their use as impact modifiers in polycarbonate resins, are described in U.S. Pat. No. 4,563,501, incorporated herein by reference.

Olefin containing copolymers such as olefin acrylates and olefin diene terpolymers can also be used as impact modifiers in the present compositions. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. They are commercially available such as, for example EPSYN 704 from Copolymer Rubber Co. They are more fully described in U.S. Pat. No. 4,559,388, incorporated herein by reference.

Various rubber polymers can also be employed as impact modifiers. Examples of such rubbery polymers include, but are not limited tom polybutadiene, polyisoprene, styrene-butadiene, and various other polymers or copolymers having a rubbery dienic monomer.

Styrene containing polymers can also be employed as impact modifiers. Examples of such polymers include acrylonitrile-butadiene-styrene, styreneacrylonitrile, acrylonitrile-butadiene-alphamethylstyrene, methacrylate-butadiene-styrene, and other high impact styrene containing polymers such as, for example, high impact polystyrene.

Other known impact modifiers include various elastomeric materials such as organic silicone rubbers, elastomeric fluorohydrocarbons, elastomeric polyesters, the random block polysiloxane-polycarbonate copolymers, and the like. The organopolysiloxane-polycarbonate block copolymers are described in U.S. Pat. Nos. 3,189,662, 3,821,325 and 3,832,419, all of which are incorporated herein by reference. Particularly useful organopolysiloxane-polycarbonate block copolymers are the dimethylsiloxane-polycarbonate block copolymers.

The amount of impact modifier present is an amount which is effective to positively upgrade the impact properties of the copolyetherester/aromatic carbonate composition. Generally, this amount is at least about 3 weight percent, preferably at least about 4 weight percent, and more preferably at least about 5 weight percent. Amounts in excess of 30 weight percent, preferably 20 weight percent, and more preferably about 15 weight percent should generally not be exceeded. Weight percent of impact modifier is based on the total amounts of copolyetherester, aromatic carbonate resin, and impact modifier present.

The compositions of the present invention may be readily prepared by physically admixing or blending the copolyetherester and the aromatic carbonate resin, and optionally the impact modifier.

The compositions of the present invention may optionally contain the commonly known and used additives for aromatic carbonate resins. These additives include antioxidants; color stabilzers such as the organophosphites; hydrolytic stabilizers such as the epoxides; mold release agents; ultraviolet radiation stabilizers such as the benzotriazoles, benzophenones, and cyanoacrylates; and flame retardants. Some particularly useful flame retardants are the alkali and alkaline earth metmetal salts of organic sulfonic acids. These types of flame retardants are disclosed, inter alia, in U.S. Pat. Nos. 3,933,734; 3,926,908; 3,948,851; 3,919,167; 3,909,490; 3,953,396; 3,931,109; 3,978,025; 3,953,399; 3,917,599, 3,951,910; and 3,940,366, all of which are incorporated herein by reference.

The compositions of the instant invention may also optionally contain various fillers such as, for example, clay, mica, carbon-black, silica, and chopped fiberglass or glass particles or spheres.

DESCRIPTION OF THE PREFERRED EMBODIMENT

In order to more fully and clearly illustrate the present invention the following examples are set forth. It is intended that the examples be considered as illustrative rather than limiting the invention as disclosed and claimed herein. In the examples all parts and percentages are on a weight basis unless otherwise indicated.

The following examples illustrate compositions falling outside the scope of the instant invention. They are presented for comparative purposes only.

EXAMPLE 1

An aromatic polycarbonate resin (derived from bisphenol-A and phosgene) as well as test bars molded from said rsin are subjected to the following tests in order to determine the physical properties thereof:

Tensile Yield (TY) in psi - ASTM D638:
Tensile Break (TB) in psi - ASTM D638;
Tensile Elongation (TE) in % - ASTM D638;
Flexural Yield (FY) in psi - ASTM D790;
Flexural Modulus (FM) in psi x $10^5$ - ASTM D790; $\frac{1}{8}''$ and $\frac{1}{4}''$ thick notched Izod impact strength test (NI) in ft. lb/in - ASTM D256;
Heat Distortion Under Load in °C. at 264 psi; and
Kasha Index (KI) in centiseconds.

The Kasha Index (KI) is a measurement of the melt viscosity of the resin. The procedure for determining the Kasha Index is as follows: 7 grams of resin pellets, dried a minimum of 90 minutes at 125° C. are added to a modified Tinius-Olsen T3 melt indexer; the temperature in the indexer is maintained at 300° C. and the resin is heated at this temperature for 6 minutes; after 6 minutes the resin is forced through a 1:05 mm radius orifice using a plunger of radius 4.7 mm and an applied force of 7.7 kgs; the time required for the plunger to travel 5.1 cm is measured in centiseconds and this is reported as the KI. The higher the KI the higher the melt viscosity of the resin and the more difficult it is to process.

The results of these tests are set forth in Table I.

EXAMPLE 2

An aromatic copolyester-carbonate resin (containing 80% ester, 93 mole % of said ester being isophthalate and 7 mole % of said ester being terephthalate) as well as test bars molded from said resin are subjected to the same tests as in Example 1. The results of these tests are set forth in Table I.

The following examples illustrate the compositions of the instant invention.

EXAMPLE 3

A blend containing 99 parts by weight of the polycarbonate resin of Example 1 and one part by weight of a copolyetherester derived from dimethylterephthalate, poly(tetramethylene oxide)diol, and a mixture of butanediol and hexanediol (the weight ratio of poly(tetramethylene oxide)diol to dimethylterephthalate being 0.55:1 and the butanediol/hexanediol mixture having a mole ratio of butanediol to hexanediol of65:35) is prepared by mixing these two components together. This blend, as well as test bars molded from this blend, are subjected to the same tests as in Example 1. The results of these tests are set forth in Table I.

EXAMPLE 4

The procedure of Example 3 is substantially repeated except that the blend contains 95 parts by weight of the polycarbonate of Example 3 and 5 parts by weight of the copolyetherester of Example 3. The results of the tests are set forth in Table I.

EXAMPLE 5

A blend containing 99 parts by weight of the copolyester-carbonate resin of Example 2 and one part by weight of the copolyetherester of Example 3 is prepared by mixing these two components together. This blend, as well as test bars molded from this blend, are subjected to the same tests as set forth in Example 1. The results of these tests are set forth in Table I.

EXAMPLE 6

The procedure of Example 5 is substantially repeated except that the blend contains 95 parts by weight of the copolyester-carbonate of Example 5 and 5 parts by weight of the copolyetherester of Example 5. The blend and test bars molded from this blend are subjected to the tests described in Example 1. The results of these tests are set forth in Table I.

TABLE I

|  | Example No. | | | | | |
| --- | --- | --- | --- | --- | --- | --- |
|  | 1 | 2 | 3 | 4 | 5 | 6 |
| wt. % polycarbonate | 100 | 0 | 99 | 95 | 0 | 0 |
| wt. % copolyester-carbonate | 0 | 100 | 0 | 0 | 99 | 95 |
| wt. % copolyetherester | 0 | 0 | 1 | 5 | 1 | 5 |
| Properties |  |  |  |  |  |  |
| TY (psi) | 9200 | 10000 | 9500 | 9900 | 10300 | 10700 |
| TB (psi) | 13600 | 12700 | 13300 | 12100 | 12200 | 10400 |
| TE (%) | 121 | 92 | 123 | 105 | 91 | 72 |
| FY (psi) | 14000 | 14300 | 14500 | 14700 | 14700 | 15600 |
| FM (psi × $10^5$) | 3.3 | 3.1 | 3.4 | 3.5 | 3.1 | 3.3 |
| $\frac{1}{8}''$ NI (ft. lb/in) | 17.1 | 10.9 | 17.4 | 17.7 | 11.5 | 2.4 |
| $\frac{1}{4}''$ NI (ft. lb/in) | 2.6 | 2.8 | 1.9 | 1.7 | 2.3 | 1.6 |
| DTUL °C. at 264 psi | 133.6 | 157.9 | 132.8 | 124.6 | 151.7 | 139.5 |
| KI (centiseconds) | 5140 | 36080 | 4850 | 3850 | 26340 | 21010 |

As illustrated by the data in Table I the compositions of the instant invention (Example 3–6) exhibit lower KIs, and therefore have improved melt flow rates and better processability, than neat polycarbonate (Example 1) and neat copolyestercarbonate (Example 2) resins.

Obviously, other modifications will suggest themselves to those skilled in the art in light of the above detailed description. All such modifications are within the full intended scope of the present invention as defined by the appended claims.

What is claimed is:

1. An aromatic carbonate resin composition comprising:
   (i) at least one aromatic bisphenol-A carbonate resin; and
   (ii) an aromatic bisphenol-A carbonate resin melt flow improving amount in the range of from about 0.5 to 15 weight percent of a copolyetherester comprised of a multiplicity or recurring long chain ester units and short chain ester units joined head-to-tail through ester linkages, said long chain ester units being represented by the formula

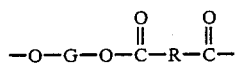

and said short chain ester units being represented by the formula

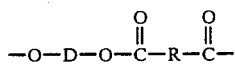

wherein
G is a divalent radical remaining after the removal of terminal hydroxyl groups from at least one poly (alkylene oxide)glycol having an average molecular weight of about 400–6000 and a carbon-to-oxygen ratio of about 2.0–4.3,
R is a divalent radical remaining after removal of carboxyl groups from a dicarboxylic acid or its ester forming reactive derivative, said acid having a molecular weight less than about 300, and
D is a divalent radical remaining after removal of hydroxyl groups from at least one diol having a molecular weight less than about 250.

2. The composition of claim 1 wherein said amount of copolyetherester is from about 1 to 15 weight percent.

3. The composition of claim 1 wherein said dicarboxylic acid or its ester forming reactive derivative of which R is the residue is dimethylterephthalate.

4. The composition of claim 3 wherein said high molecular weight poly(alkylene oxide)glycol of which G is a residue is poly(tetramethylene oxide) glycol.

5. The composition of claim 4 wherein said low molecular weight diol of which D is a residue is selected from butanediol hexanediol, or mixtures thereof.

6. The composition of claim 5 wherein said low molecular weight diol is selected from a mixture of butanediol and hexanediol.

7. The composition of claim 6 wherein said diol mixture contains at least about 40 weight percent butanediol.

8. The composition of claim 6 wherein said aromatic carbonate resin is an aromatic polycarbonate resin.

9. The composition of claim 8 wherein said aromatic polycarbonate resin is derived from bisphenol-A and phosgene.

10. The composition of claim 8 which additionally contains an effective impact modifying amount of at least one impact modifying compound.

11. The composition of claim 10 wherein said impact modifying compound is linear low density polyethylene.

12. The composition of claim 6 wherein said aromatic carbonate resin is an aromatic copolyestercarbonate resin.

13. The composition of claim 12 which additionally contains an effective impact modifying amount of at least one impact modifying compound.

14. The composition of claim 13 wherein said impact modifying compound is linear low density polyethylene.

15. The composition of claim 1 wherein said aromatic carbonate resin is an aromatic polycarbonate resin.

16. The composition of claim 15 wherein said aromatic polycarbonate resin is derived from bisphenol-A and phosgene.

17. The composition of claim 16 which additionally contains an effective impact modifying amount of at least one impact modifying compound.

18. The composition of claim 17 wherein said impact modifying compound is linear low density polyethylene.

19. The composition of claim 1 wherein said aromatic carbonate resin is an aromatic copolyestercarbonate resin.

20. The composition of claim 19 which additionally contains an effective impact modifying amount of at least one impact modifying compound.

21. The composition of claim 20 wherein said impact modifying compound is linear low density polyethylene.

* * * * *